March 28, 1967  J. A. SCHMIDTLEIN  3,311,769
GASEOUS DISCHARGE LAMP WITH INTERNALLY COOLED ELECTRODES
Filed April 12, 1965  3 Sheets-Sheet 3

INVENTOR,
JOHN A. SCHMIDTLEIN
BY Harry M. Saragovitz
Edward J. Kelly
Herbert Berl
John W. Poteet, Jr.
ATTORNEYS United States Patent Office 3,311,769
Patented Mar. 28, 1967

3,311,769
GASEOUS DISCHARGE LAMP WITH INTERNALLY COOLED ELECTRODES
John A. Schmidtlein, Alexandria, Va., assignor to the United States of America as represented by the Secretary of the Army
Filed Apr. 12, 1965, Ser. No. 447,584
7 Claims. (Cl. 313—32)

The invention described herein may be manufactured and used by or for the Government of the United States of America for governmental purposes without the payment to me of any royalties thereon.

This invention relates in general to high intensity light sources of the xenon short arc lamp variety and in particular to such sources incorporating internal electrode cooling means of the liquid coolant variety wherein the conventional transfer of heat energy to the coolant by conduction is enhanced by a change of state absorption of heat energy which affords a substantially greater cooling per measure of liquid coolant.

Xenon lamp sources are recognized as substantially superior to carbon arc devices in many respects and are rapidly replacing such devices in many applications, searchlights, for example. It has been found that xenon lamp sources are capable of especially high candlepower per unit size. They may be ruggedly built to withstand severe shock tests and extreme climatic conditions over extended periods of time. Moreover, it has been found that xenon lamp sources may be operated under high humidity conditions without adverse effect. It is readily apparent to those skilled in the art, however, that the use of gas-filled arc lamps of this variety is limited by rapid deterioration of the electrodes at their relatively high operating temperatures and inherent coefficient of expansion problems, especially in the quartz to metal seal area. It will be appreciated that a simple and efficient means for reducing the temperature of the electrodes during operation is needed and would be welcomed as a substantial advancement of the art.

It is an object of this invention to provide a gas-filled short arc lamp incorporating electrode cooling means which affords uniform cooling of the arc end thereof.

It is another object of this invention to provide a gas-filled short arc lamp incorporating electrode cooling means which requires a minimum liquid coolant supply during operation.

It is also an object of this invention to provide a gas-filled short arc lamp incorporating electrode cooling means which is relatively simple to fabricate.

It is still another object of this invention to provide a gas-filled short arc lamp incorporating electrode cooling means which is relatively lightweight.

It is an additional object of this invention to provide a gas-filled short arc lamp incorporating electrode cooling means which assures a determined arc configuration.

Other objects of this invention will become apparent upon a more comprehensive understanding of the invention for which reference is had to the following specification and drawings wherein.

Figure 1:
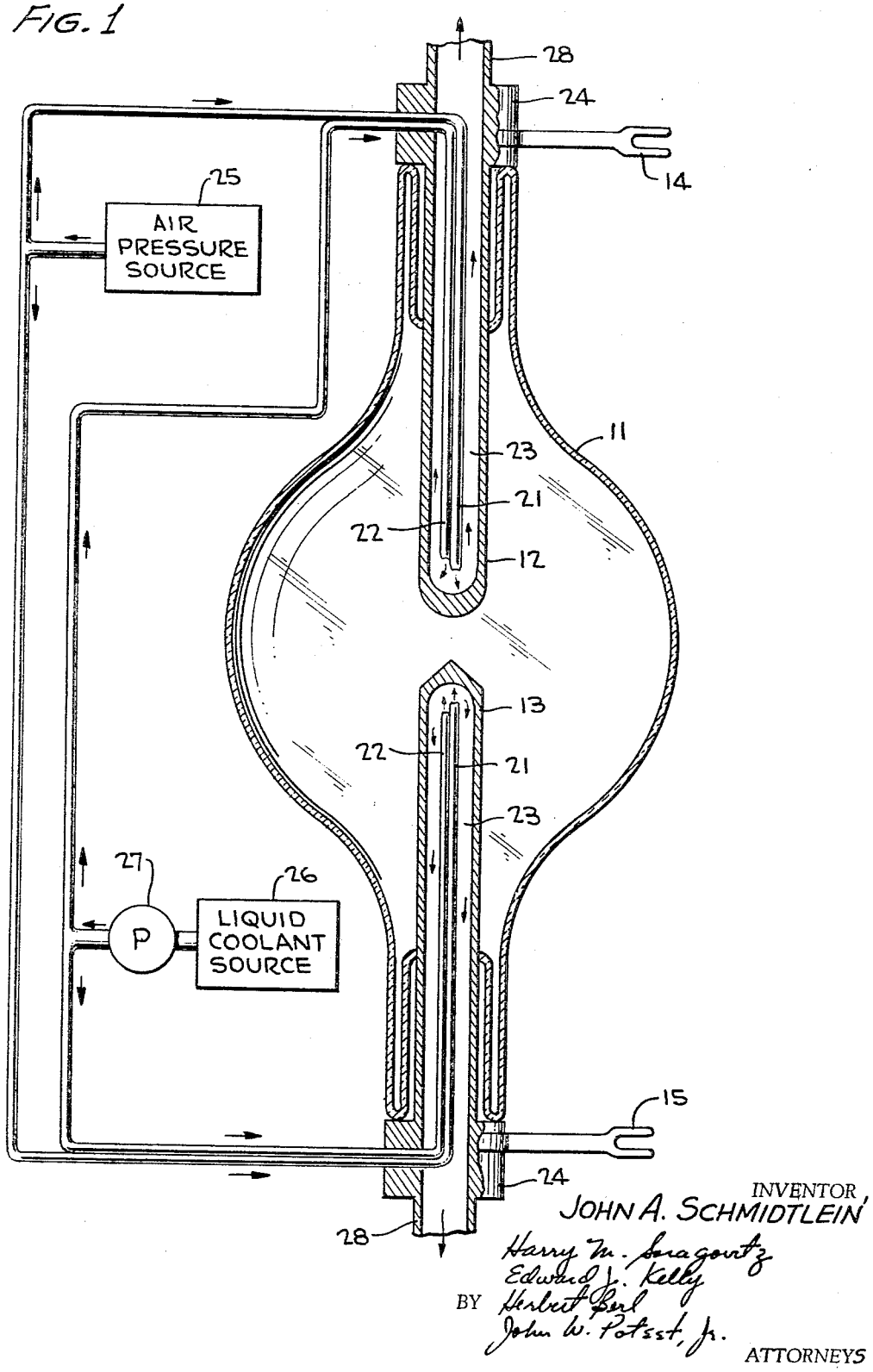
FIGURE 1 is a cross-sectional showing of a xenon lamp structure in accordance with one embodiment of the invention.

Briefly, the device of this invention is a gas-filled short arc lamp having electrodes especially adapted for internal cooling such that deterioration of the arc electrodes by melting is minimized.

Referring now to the drawings:

FIGURE 1 depicts a gas-filled short arc lamp structure suitable for use in searchlight applications comprising a sealed quartz glass envelope 11 containing two elongated electrodes 12 and 13 of electrically conductive material, for example, molybdenum. As in conventional short arc lamp devices, the electrodes 12 and 13 are disposed in axial alignment and in predetermined spaced relation to enable energization of an arc thereacross upon application of a selected voltage across the electrical terminals indicated at 14 and 15. It will be appreciated, of course, that it is not essential to this invention that the electrodes be elongated nor that they be disposed in axial alignment.

Also in accordance with recommended practice in the art, the arc end configurations of the electrodes 12 and 13 differ. Basically the electrode 12 has a conventional anode configuration and the electrode 13 has a conventional cathode configuration. It is understood, of course, that it is not critical to the device of this invention that the electrode arc end configurations differ, as shown, nor that the depicted end configurations be utilized for either electrode.

In the embodiment of FIGURE 1, each of the electrodes 12 and 13 are hollowed with two tubular members 21 and 22 disposed therein. It will be noted that the tubular members 21 and 22 do not completely fill the hollow region of the electrodes 12 and 13. Thus, in effect, the tubular members 21 and 22 define three passageways, the third passageway being the region between the inner wall of each electrode and the outer walls of its respective tubular members 21 and 22. This third passageway is indicated at 23 in the drawing.

In accordance with this invention, the tubular member 21 which may be slightly longer than the tubular member 22, as shown, is connected via a coupler unit 24 to an air pressure source 25. Likewise, the tubular member 22 is connected via the coupler unit 24 to a liquid coolant source 26 which may include a pump means 27, as shown, in selected applications.

In operational analysis of the electrode cooling means of FIGURE 1, a continuous jet of air is injected into the hollow arc end of each electrode via the tubular member 21, as indicated by the arrow. Likewise, a continuous jet of a liquid coolant, for example, water, is simultaneously injected into the same hollow arc end area via short tubular member 22, also as indicated by arrow. In accordance with the invention, the air vaporizes the water in the hollow arc end area of the electrode, and the vapor is transformed into a gaseous state upon contact with the hot electrode. Thereupon the gaseous air/water mixture is exhausted from the hollow arc end via the passageway indicated at 23 and exit ports 28 into the atmosphere or into any convenient container, not shown.

It will be appreciated that in the embodiment of FIGURE 1, the air jet produces a siphon action on the liquid coolant in member 22 and that in selected applications the pump means 27 may not be necessary. However, in other applications, where a greater degree of cooling may be required, the pump means 27 may be utilized to cause a fast flow through the electrode cooling means, for example 2–7 gallons per minute.

The vapor-cooled embodiment of FIGURE 1 affords a substantial improvement over the prior art water-cooled devices not only in the amount of liquid coolant required but in overall size per lamp output, in reliability, and in efficiency of operation. It is recognized that temperature reduction in the embodiment of FIGURE 1 is largely dependent upon the removal of heat energy by a change in state, from liquid to a gas, and that heat transfer by conduction has a relatively minor role in the reduction of electrode temperature. It is appreciated, therefore, that the introduction of a poor conductor, air, to vaporize the coolant in the vicinity of the electrode arc end reduces the efficiency of heat transfer by conduction but does not seriously impair the overall efficiency of this embodiment.

Figure 2:
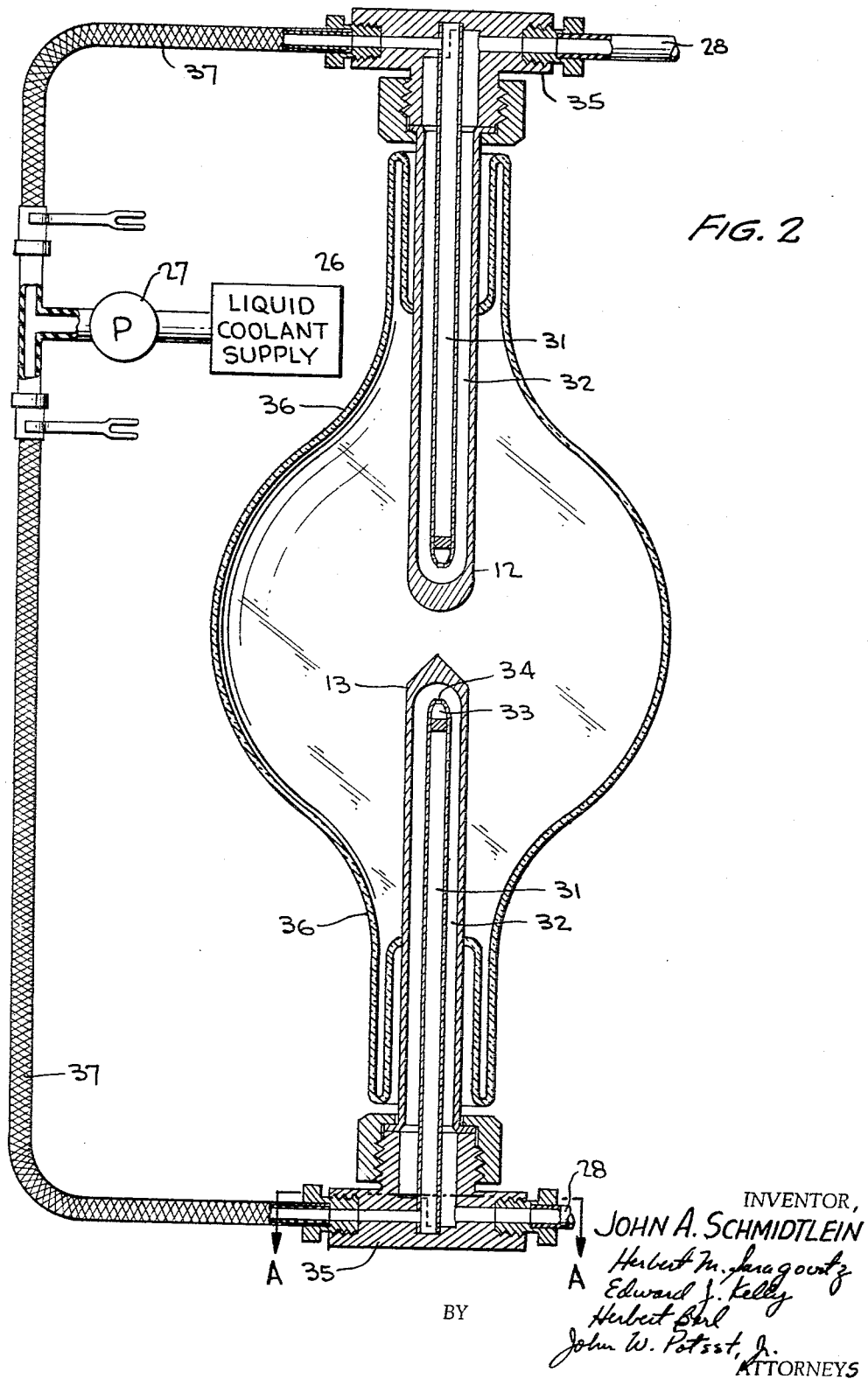
FIGURE 2 is a cross-sectional showing of the xenon lamp structure in accordance with a second embodiment of the invention.

The embodiment of FIGURE 2 is preferred over the embodiment of FIGURE 1, however, where optimum size reduction, coupled with a minimum liquid coolant requirement and a precise arc configuration, is the goal.

The sealed quartz glass envelope 11 and the two elongated electrodes 12 and 13 in the embodiment of FIGURE 2 are substantially similar to that shown in the embodiment of FIGURE 1, but it will be noted that the internal electrode cooling means and the means for supplying the liquid coolant and the electrical energization to the electrodes are substantially different. In this embodiment, the hollowed electrodes 12 and 13 each contain a single axially aligned tubular member 31 having an outer diameter less than the inside diameter of the electrodes such that a second passageway, indicated at 32, is formed therebetween.

It will be appreciated that the single tube coaxial arrangement described above is well-known in the art and is commonly used in simple liquid coolant applications having a lesser cooling requirement than the present device. For example, a single tube structure is disclosed by H. C. Snook et al. in U.S. Patent 1,143,327 which issued June 15, 1915.

Figure 4:
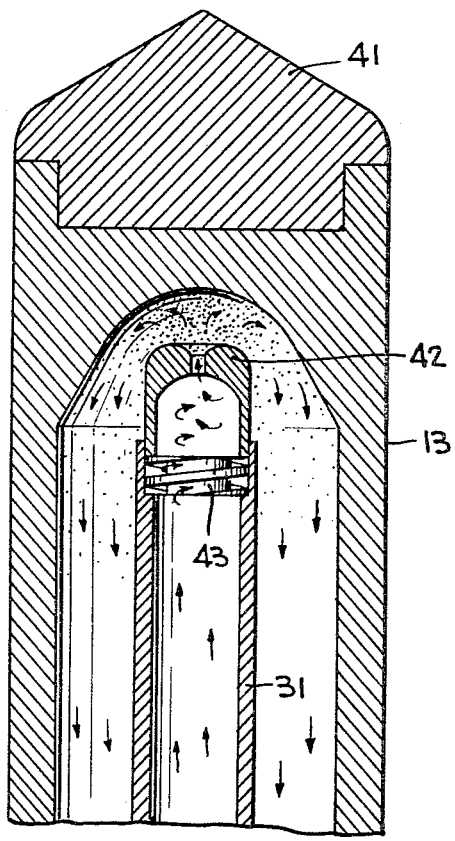
FIGURE 4 is a more detailed showing of an electrode end structure suitable for use in the assembly of FIGURE 2.

In structural distinction over such prior art cooling means, however, the end section of the tubular member 31 in the vicinity of the electrode arc end is adapted, as shown in more detail in FIGURE 4, to provide a vaporization chamber, indicated at 33, with a nozzle outlet, indicated at 34, through which the liquid coolant is directed at the electrode arc end in a highly vaporized state such that optimum cooling of the electrode arc end is obtained.

Also in accordance with a basic objective of this invention, the coupler block 35 in the embodiment of FIGURE 2 is substantially reduced in size and weight. This reduction in weight does, of course, minimize the loading on the envelope 11 in the quartz to metal seal area thereof, indicated at 36. In this embodiment, the hose 37 has a flexible metallic outer surface, for example, of the corrugated bronze variety known in the trade as Annaconda S-1. This hose not only carries the liquid coolant from the liquid coolant supply 26 via pump 27 and the T section 38 but also serves to energize the two electrodes. It is essential to this embodiment, of course, that the hose 37 connected to each electrode be electrically isolated from the other and for this reason the T section 38 should be made of electrically nonconducting material and the hose 37 should include an inner surface of electrically insulating material.

Figure 3:
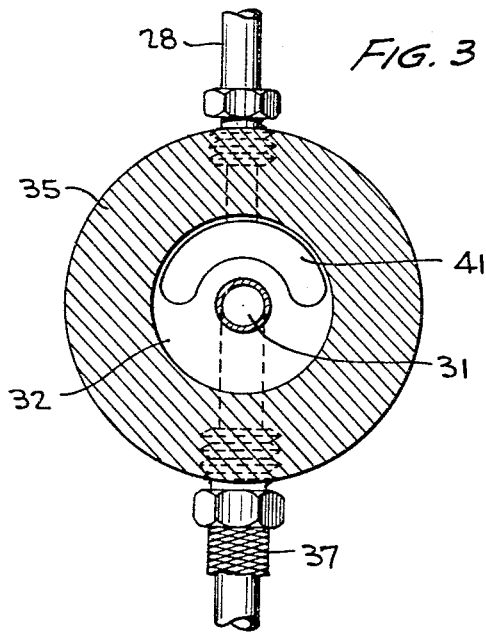
FIGURE 3 is a more detailed cross-sectional showing of the electrode cooling means coupler assembly in the embodiment of FIGURE 2.

FIGURE 3 is a cross-sectional view of the coupler 35 taken along the line A—A in FIGURE 2 which shows the hose 37 and the outlet port 28 connection to the input passageway of the tubular member 31 and the surrounding output passageway 32 within the hollowed electrode structure. It will be appreciated that the single half-moon aperture indicated at 41 is merely exemplary and that more than one aperture of any suitable configuration may be incorporated, if desired. It has been found that the current carrying liquid coolant hose feature of the embodiment of FIGURE 2, which changes the heavy electrical terminals location, not only reduces the weight of the coupler 35 which relieves the strain on the glass envelope but also, the passage of liquid coolant through the hose increases the current carrying capacity of the metallic outer surface. Thus, it has been found that the auxiliary use of the hose as an electrical conductor ordinarily does not require significant enlargement of the hose beyond that determined by its liquid coolant carrying capacity.

FIGURE 4 is a detailed cross-sectional showing of a cathode electrode end structure which illustrates the operation of the cooling means upon application of a liquid coolant under pressure via the coupler 35 in the embodiment of FIGURE 2. In FIGURE 4 a thoriated tungsten tip 41 is welded, swedged, pinned or otherwise fastened within a milled recess in the end of a drilled rod of molybdenum. It will be appreciated that molybdenum is employed for the electrode 13 with a tungsten tip in preference to an all tungsten member because molybdenum is readily machined whereas tungsten is not so easily worked by conventional machining techniques.

Further, it will be appreciated that the internal configuration of the hollowed electrode 13 is determined by the drill employed and that, for example, the precise end curvature of the hollow shown in the drawing is not critical to the invention. It is, however, important that the vaporized coolant be properly distributed in a predetermined manner over this internal surface. Consequently, it is conventional practice to provide an internal surface with little or no discontinuity in the end area.

In the depicted embodiment, the tubular member 31, which may be of a noncorrosive material such as stainless steel, and the vaporization chamber comprising the hollowed nozzle unit 42 and the whirl element 43 are separately manufactured and then assembled in accordance with standard practice by brazing techniques or otherwise, depending upon the material or materials involved.

It has been found that the nozzle unit 42 should be in close proximity to the internal surface of the hollowed arc end of the electrode to be cooled. In actual practice it has been found that a ¼-inch spacing affords satisfactory performance but that, as the spacing is increased, a pocket of pressure develops at the top due to steam formation at this point and knocking, a condition similar to that found in some residential hot water heating systems, develops. It will be appreciated that such a pressure pocket at the tip adversely affects the cooling effect obtained and over a period of time may present serious structural complications, as well.

As shown by the arrows in FIGURE 4, the liquid coolant enters the vaporization chamber via the whirl element 43 whereby it is effectively broken apart into a vapor, whereupon the vapor exits via the nozzle 42 opening and is distributed over the internal surface of the electrode arc end. At this point, the high temperature of the electrode, which may be in the vicinity of 2800° K., affords a change in state to occur which in transition changes the energy level and thus provides an additional cooling in this area.

Figure 5:
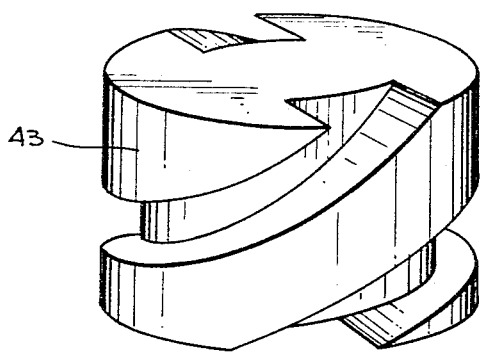
FIGURE 5 is a pictorial showing of the whirl means in the FIGURE 4 embodiment.

FIGURE 5 is a pictorial showing of the whirl element 43 shown in cross section in FIGURE 4. It will be noted that the whirl element 43 is shown as a double fluted or threaded member having less than a single threaded turn thereon. It is not essential that the whirl element 43 be double fluted, however, and a greater or lesser number of flutes may be utilized, if desired. Likewise, the length of the threaded turn is not critical, provided, of course, it is sufficient to transfer the liquid coolant into a vapor form upon transmission therethrough.

Furthermore, it will be recognized that the whirl element exemplarily shown in FIGURE 5 is but one of many vaporizing means well known in the art and that various other means may be employed to produce a vapor in the vicinity of the hollowed arc end of the electrode as taught by this disclosure.

Similarly, it is not essential that a single port hollowed nozzle be employed. Consequently, various other nozzles known in the art may be substituted, if desired, to distribute the vapor produced in an adjacent vaporization chamber.

It will be appreciated that, in both the embodiments of FIGURE 1 and of FIGURE 2, the vaporization is produced in the immediate vicinity of the area to be cooled and the vapor is transformed into a gaseous state upon application to the underside of the electrode arc end. Thus both of these embodiments afford temperature reduction (1) by change of state and (2) by simple conduction. It has been found that this dual effect temperature reduction is vastly superior to the more conventional water cooling process involving simple conduction. To clearly illustrate the substantial increase in cooling obtained by the device of this invention, the embodiment of FIGURE 1 has been operated in accordance with the change of state teaching described herein and then operated in the absence of the air jet, substantially in the manner of the prior art, with simple water cooling of the electrodes.

In the first instance, the lamp was operated at 694 watts for a six minute period, 304 watts were removed during this period, and the mass of water required was 72 grams. Thus the ratio of watts removed per gram of water in the change of state case was 304/72 or 25.3 watts/gram.

In the second instance, the same lamp was operated with water cooling of the electrodes under identical ambient conditions at 710 watts for a six-minute period, 442 watts were removed during this period, and the mass of water required was 700 grams. Thus the ratio of watts removed per gram of water in the prior art case was 442/700 or .63 watts/gram.

Lamps operating at higher wattage have been investigated with similar results. In each instance the removal of 539.55 cal./gram (100° C.) during the course of the change of state has proved at least a 22 to 1 advantage over the simple heat transfer by conduction technique of the prior art. It has been possible to remove at least 10 kw. from a 20 kw. lamp utilizing the electrode cooling system of the lamp described herein.

Finally, it is understood that this invention is only to be limited by the scope of the claims appended hereto.

What is claimed is:

1. A high intensity light source comprising a sealed, gas-filled, light transparent envelope containing two electrodes disposed with a first arc end of each in spaced relation such that an arc may be energized across the adjacent first arc ends thereof upon application of a selected voltage there-across; each of said electrodes being hollowed in the region of said first arc end with said first arc end closed; means for energizing said electrodes; and means for applying liquid coolant substantially in vapor form to the internal surface of said closed first arc end of each of said hollowed electrodes such that upon contact with the energized electrode in the vicinity of said first arc end, a change of state from liquid to gas occurs and the gaseous mixture formed thereby is exhausted from said hollowed region of each respective electrode.

2. A high intensity light source as defined in claim 1 wherein said envelope is filled with xenon and said means for applying liquid coolant substantially in vapor form to said internal surface includes tubular means disposed within said hollowed electrodes and adapted to convey said coolant to the vicinity of said closed arc end in liquid form and to vaporize said coolant in said vicinity.

3. A high intensity light source as defined in claim 2 wherein said means for applying liquid coolant substantially in vapor form to said internal surface includes an air pressure source and said tubular means is a dual tube means with a first tube member adapted to convey liquid coolant and a second tube member adapted to convey air under pressure from said air pressure source to said vicinity of said closed arc end.

4. A high intensity light source as defined in claim 3 wherein said liquid coolant supply means includes means for supplying liquid coolant via said first tube member under pressure.

5. A high intensity light source as defined in claim 3 wherein said output end of said second tube member is disposed relative said output end of said first tube member such that the output of said second tube member affords a siphon action on the liquid coolant in said first tube member.

6. A high intensity light source as defined in claim 2 wherein said liquid coolant supply means includes means for supplying liquid coolant via said tubular means under pressure, said tubular means include means for vaporizing said liquid coolant and said means for vaporizing is disposed within each hollowed electrode in the vicinity of said closed arc end thereof.

7. A high intensity light source as defined in claim 6 wherein said means for vaporizing said liquid coolant is a vaporization chamber having a whirl input means adapted to break the liquid coolant into particles and a nozzle output means adapted to distribute the vaporized liquid coolant over said internal surface.

References Cited by the Examiner
UNITED STATES PATENTS

| | | | |
|---|---|---|---|
| 2,096,539 | 10/1937 | Gebauer | 313—30 |
| 2,110,774 | 4/1938 | Privett | 313—12 X |
| 3,054,921 | 9/1962 | Lye | 313—32 X |
| 3,256,383 | 6/1966 | Sasorov | 313—32 X |

JAMES W. LAWRENCE, *Primary Examiner.*

C. R. CAMPBELL, *Examiner.*